Oct. 27, 1931.  A. M. TURNER  1,829,690
ELECTRIC LAWN MOWER
Filed Jan. 12, 1931    2 Sheets-Sheet 1
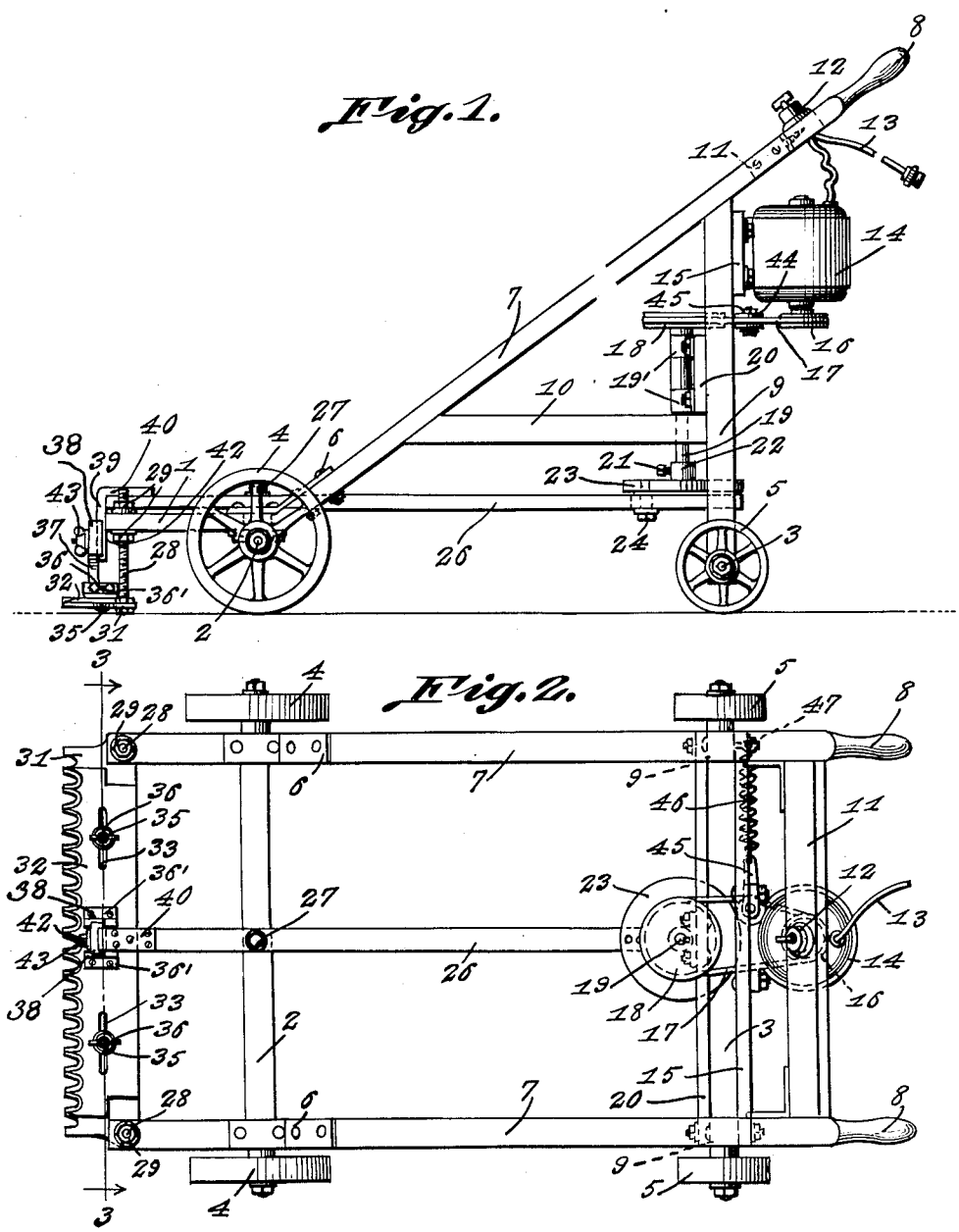

Oct. 27, 1931.  A. M. TURNER  1,829,690
ELECTRIC LAWN MOWER
Filed Jan. 12, 1931    2 Sheets-Sheet 2
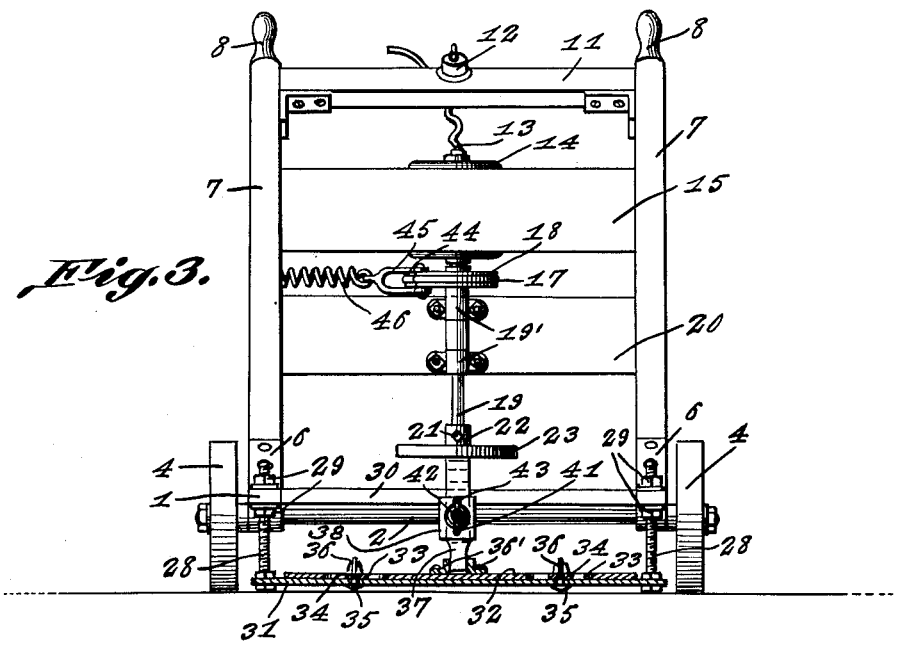
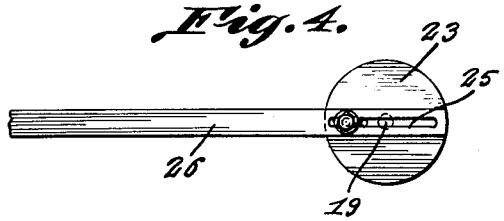
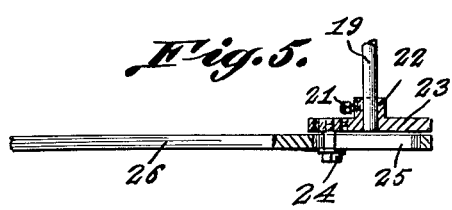
A. M. Turner, INVENTOR Patented Oct. 27, 1931

1,829,690

UNITED STATES PATENT OFFICE

ALVIN M. TURNER, OF SPARTANBURG, SOUTH CAROLINA

ELECTRIC LAWN MOWER

Application filed January 12, 1931. Serial No. 508,285.

My present invention has reference to a lawn mower and my object is the provision of a lawn mower which is electrically operated, which is easily propelled, which is readily adjustable to regulate the stroke of the cutter blade, which is provided with simple means for vertically adjusting the cutter and finger blades so that the lawn may be cut at desired heights, and also one which is of a simple construction, which may be cheaply manufactured and marketed.

To the attainment of the foregoing and many other objects which will present themselves as the nature of the invention is better understood, the improvement resides in the construction, combination and operative association of parts, one satisfactory embodiment of which is disclosed by the accompanying drawings.

In the drawings:

Figure 1 is a side elevation of a lawn mower in accordance with this invention.

Figure 2 is a top plan view thereof.

Figure 3 is a sectional view approximately on the line 3—3 of Figure 2.

Figure 4 is a detail view to illustrate the pitman connection between the lever and the disc.

Figure 5 is a side elevation thereof with parts in section.

In carrying out my invention I provide a base frame 1 that consists of longitudinal members at their rear ends and likewise held in proper spaced relation by front and rear axles 2 and 3, respectively. These axles have journaled on their spindle ends front and rear wheels 4 and 5, respectively, the rear wheels being smaller than the front wheels.

Secured by suitable brackets 6 to the side members of the frame 1 there are the upwardly inclined rearwardly disposed bars 7 that terminate in handles 8, the said handles being disposed a suitable distance at the rear of the frame 1, and the inclined handle bars 7 are supported by uprights 9 secured to the side members of the frame 1, there being suitable braces 10 between the handle bars and the uprights 9.

In the showing of the drawings the shaft for the rear wheels is connected directly to the ends of the uprights 9 that depend below the frame member 1.

The handle bars 7, inward of their handle ends are held spaced by a suitable braced transverse bar 11, and on the center of this bar there is a hand operated switch 12 that controls the current that passes through the conductor wires 13 to the motor 14. The motor is fixedly secured to a transverse plate 15 bolted or otherwise rigidly fixed on the uprights 9 and the shaft of the motor has fixed on its lower or depending end a grooved or pulley wheel 16.

Before proceeding further it is to be understood that the cord or conductor 13 is of a suitable length and has a plug end designed to be received in a socket for a house circuit.

The pulley 16 has trained therearound an endless belt 17, the said belt being also trained around a pulley 18 which is preferably larger than the pulley 16. The pulley wheel 18 is fixed to a vertically disposed shaft 19 that is journaled and held from longitudinal movement through suitable bearings 19' fixed on a plate 20 that is bolted or otherwise secured to the outer edges of the uprights 9. The shaft has adjustably secured, by means 21, on its lower end the socket portion 22 of a disc 23. The disc is provided with any desired number of eccentrically arranged openings and through any one of these openings there is screwed the threaded end of a wrist pin 24. The wrist pin passes through an elongated slot 25 in a lever 26. The lever is normally centrally arranged in a longitudinal plane to the frame 1 and the said lever is pivoted, as at 27, to either the shaft 2 or to a transverse brace element for the frame 1 arranged directly above the shaft.

The outer ends of the side members of the frame 1 have passed through openings in the outer ends thereof vertically disposed bolts 28, respectively. These bolts have screwed thereon nuts 29 which are in contact with the upper and lower faces of the beam 30 that is arranged directly above the axle 2, while the lower ends of the bolts are fixedly secured to the ends of the plate or body of the finger bar 31 of the cutter. The knife bar, which is arranged for longitudinal reciprocatory movement over the finger bar, is indicated by the numeral 32, the same being provided with spaced longitudinal openings 33 that receive therein and have their side walls contacted by rollers 34 which are journaled in bolt members 35 carried by the finger bar 31. The bolts 35 are engaged by wing nuts 36 which are of a size to bridge the slots 33.

The cutter bar 32, at the center thereof, is formed with a socket, the same preferably comprising a pair of spaced angle brackets 36', the angle brackets receiving therebetween a finger member 37. The finger 37 has its upper end widened and flanged, as at 38, and received between these flanges there is the depending arm 39 of an angle bracket 40 which is fixedly secured to the outer end of the lever 26. The widened end of the finger is provided with an elongated slot 41 and the depending arm 39 of the bracket has passed therethrough a bolt 42 which also passes through a slot 41 in the flanged upper end of the finger 37. This bolt is engaged by a wing nut 43 of a size to bridge the slot 41.

In order to properly tension the belt 17 one of the leads thereof is contacted by a roller 44 which is pivotally secured to the arms of a yoke 45 that straddles the said lever of the bracket. The yoke 45 has connected thereto a helical spring 46, the said spring having its outer end adjustably connected with a hook or like element 47 preferably secured to one of the uprights 9.

The mower is of the walking type, the operator propelling and guiding the mower by placing his hands on the handles 8. The switch 12 can be readily engaged by one of the hands of the operator. The motor turning the shaft 19 and disc 23 will impart an oscillatory movement to the lever 26, causing the same to swing on the fulcrum or pivot 27 and thus imparts a reciprocatory movement to the cutter blade. The lawn is mowed without manual power other than required in wheeling the frame. The throw of the lever may be regulated by adjusting the wrist pin 24 in the openings in the disc 23. The cutter can be adjusted by regulating the nuts 29 on the bolts 28 and by adjusting the wing nut 43 on the bolt 42. In this connection it is to be noted that the cutter is susceptible to having one of its ends vertically adjusted independent of the adjustment of the other cutter so that the mower can be successfully employed on angle or inclined lawn surfaces. The cutter being spaced away from the front of the frame can successfully cut the edges of the lawn, and the construction and operation of the improvement will, it is thought, be understood and appreciated by those skilled in the art to which such invention relates without further detailed description. In this connection I desire to state, however, that I do not wish to be restricted to the precise details herein set forth and, therefore, hold myself entitled to make such changes therefrom as fairly fall within the scope of what I claim.

Having described the invention, I claim:

A lawn mower, including a wheeled frame, angle handle bars arising from the frame, vertical supports between the frame and bars, an electric motor fixed on the supports, a switch for the motor carried by the handle bars, said motor having a pulley wheel on the shaft thereof, a depending shaft journaled through bearings supported on the uprights and having a pulley wheel, a belt trained around both named pulley wheels, a spring influenced tightener engaging one of the leads of the belt, a disc adjustably secured on the lower end of the last mentioned shaft and having spaced threaded openings therethrough, a lever pivotally secured at the forward end of the frame and having an elongated slot through the rear end thereof, a pitman passing through the slot and having a threaded end to engage with one of the openings in the disc, bolt members passing through the sides of the frame at the forward end thereof and engaged by nuts which contact with the upper and lower faces of the said frame, a finger bar to which the lower ends of the bolts are secured, a cutter bar arranged over the finger bar and provided with spaced elongated slots, bolt members passing through the finger bar and through the said slot, rollers on the bolts, nuts screwed on the bolts, a socket on the upper face of the cutter bar at the center thereof, an angle bracket on the outer end of the lever having a depending arm, a finger received in the socket of the cutter bar and having a widened or flanged portion receiving the depending arm of the bracket therein and means for adjustably securing the finger to the said arm of the bracket.

In testimony whereof I affix my signature.

ALVIN M. TURNER.